(No Model.) 2 Sheets—Sheet 1.

J. F. KING & S. B. STOKELY.
BEAN HARVESTER.

No. 479,600. Patented July 26, 1892.

(No Model.) 2 Sheets—Sheet 2.

J. F. KING & S. B. STOKELY.
BEAN HARVESTER.

No. 479,600. Patented July 26, 1892.

Witnesses
Raymond F. Barnes.
Fabius J. Elmore.

Inventors
J. F. King
S. B. Stokely
By their Attorney P. T. Dodge

UNITED STATES PATENT OFFICE.

JOSEPH F. KING, OF MONTALVO, CALIFORNIA, AND SAMUEL B. STOKELY, OF KANSAS CITY, MISSOURI, ASSIGNORS TO THE EAGLE MANUFACTURING COMPANY, OF DAVENPORT, IOWA.

BEAN-HARVESTER.

SPECIFICATION forming part of Letters Patent No. 479,600, dated July 26, 1892.

Application filed March 4, 1892. Serial No. 423,766. (No model.)

*To all whom it may concern:*

Be it known that we, JOSEPH F. KING, a resident of Montalvo, in the county of Ventura and State of California, and SAMUEL B. STOKELY, a resident of Kansas City, county of Jackson, and State of Missouri, have invented a new and useful Improvement in Bean-Harvesters, of which the following is a specification.

Our invention relates to a machine intended for rapidly severing bean stalks or vines planted in rows and delivering the same in windrows to the right and left of the machine.

To this end the machine comprises as its essential element a wheeled frame provided with steering appliances and with obliquely-arranged shares or cutters to travel upon or close to the surface of the ground.

It also comprises a forward central cutter by which the vines are divided, so that they may be thrown to the right and left.

Figure 1:
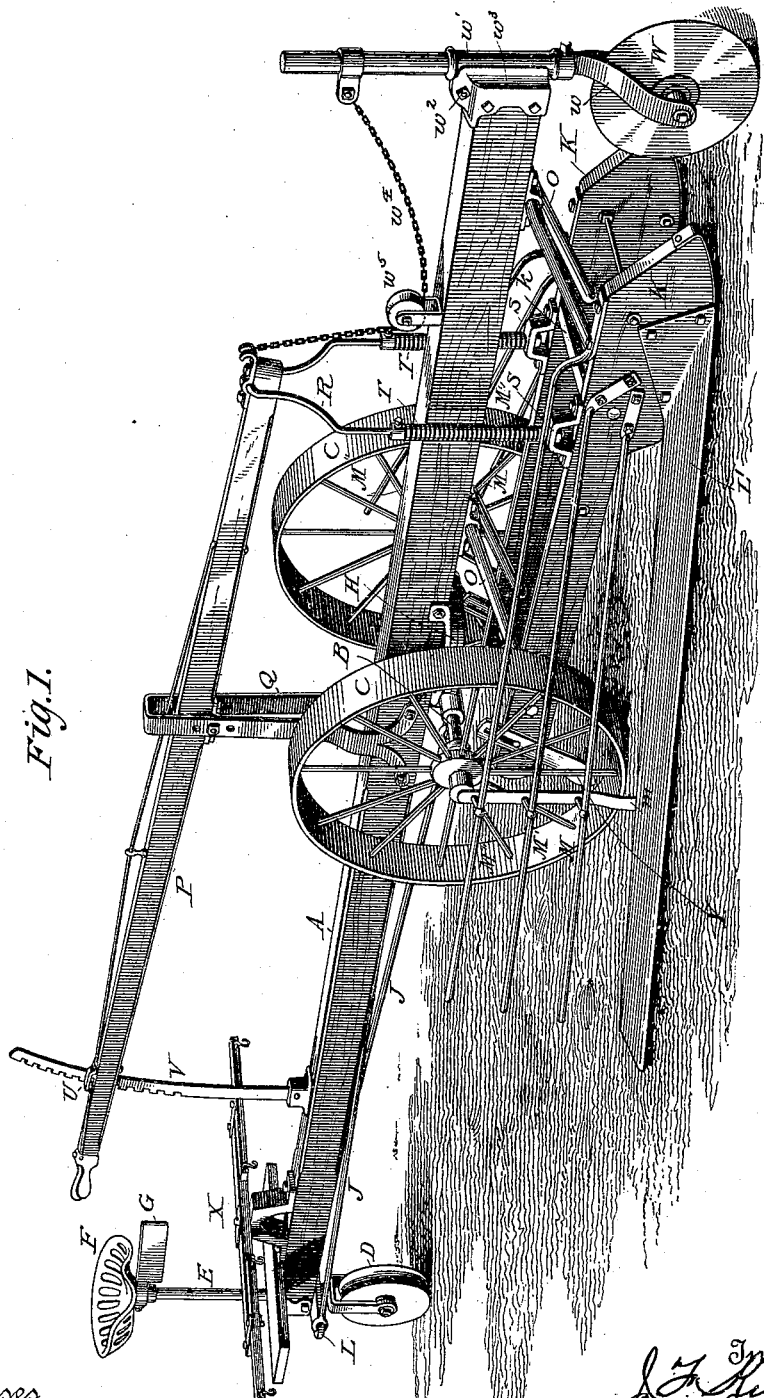
Figure 2:
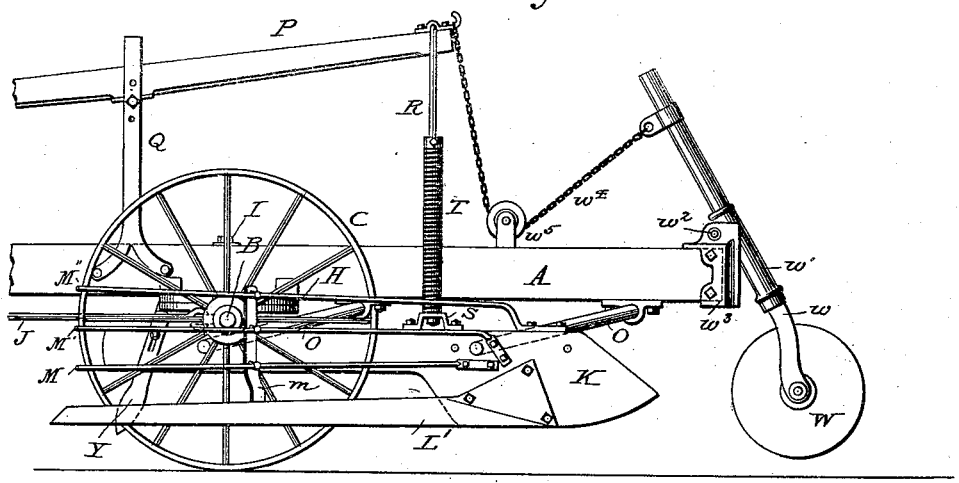
Figure 3:
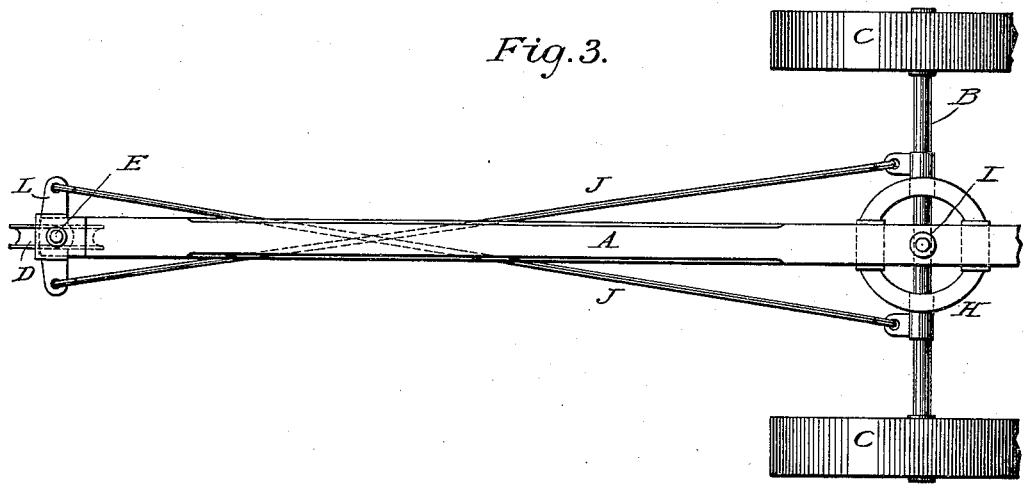

In the accompanying drawings, Figure 1 is a perspective view of our improved machine. Fig. 2 is a detailed view illustrating the manner in which the cutters are lifted out of action. Fig. 3 is a plan view illustrating the action of the governing or steering devices.

Referring to the drawings, A represents a long beam or thrust-bar sustained midway of its length, or thereabout, upon an axle B, mounted at its ends in two ground-wheels C C. The beam, which forms in effect the main frame of the machine, is further sustained at the rear end by a grooved or flanged ground-wheel D, mounted in the lower forked end of an upright steering-shaft E, mounted to turn in a box or bearing fixed to the beam. The steering-shaft E serves, also, as a standard to support the driver's seat F and is provided with a forwardly-extending arm G, which, lying between the operator's legs, enables him without using his hands to turn the shaft and steering-wheel D to the right or left, as may be demanded.

The front axle B, instead of being fixed rigidly to the beam A, as it may be, is preferably mounted in a swiveling plate H, turning around a vertical axis I, as shown in Fig. 3. This plate is connected by crossed chains or rods J with opposite ends of a plate L, so that when the rear wheel is turned in one direction the front wheels will be swiveled or turned in the opposite direction, facilitating the control of the machine and enabling it to move instantly to the right or left or to turn in a short space at the end of the field.

Beneath the forward end of the main frame are two parallel longitudinal runners K K, rigidly connected by a cross-bar *k* or other suitable connections and each provided near the forward end with a strong share or cutting-blade L', bolted firmly thereto and extending outward and rearward therefrom. Each runner is also provided above its blade with a series of rods M M', &c., fixed thereto at their forward ends and extending rearward each above the next in lines substantially parallel with the lower edge of the blade. These rods or deflectors M M' M'' may be sustained by standards *m*, rising from the blades, or sustained in any other suitable manner.

The runner-frame is freely suspended at its front and rear ends on the under side of the beam by cranked or bent arms O, each mounted at its middle in a box on the under side of the beam, and having its two ends projected rearward and downward and mounted in bearings in the runners, this connection allowing the runners to rise and fall freely in order to adjust themselves to the surface of the ground, while at the same time they are carried positively forward.

P represents a long hand-lever lying above the beam A and mounted in standards Q, rising therefrom. The rear end of this lever is within convenient reach of the operator, while its forward end is provided with a ∩-shaped rod R, the lower ends of which are projected through plates S, rising from the runners, and provided with heads or nuts beneath these plates, so that when the rear end of the hand-lever is depressed the rods will serve to lift the runners out of action. Each rod is free to play upward and downward to a limited extent through the plate S and is provided above the plate with a spiral spring T, held under compression by an overlying collar on the rod. At its rear end the lever is provided with an ordinary latch or locking device U, engaging a standard V, whereby the lever may be held in any required position either to hold the runners and cutters upward out of action or to keep the springs T under more or less compression, in order that they may force the runners and blades down with suitable pressure to insure their proper action.

It will frequently happen that the vines are so interwoven or interlocked as to render it very difficult to thrust the runners and blades through them. We therefore provide at the front of the machine a cutter, the office of which is to divide the vines centrally in the path of the machine. This cutter may be of any appropriate form; but as shown in the drawings it consists of a circular knife W, mounted in the lower forked end of a rod $w$, carried by a casting $w'$, which is in turn connected by a horizontal pivot $w^2$ to the top of a casting $w^3$, bolted to the front of the beam. When the machine is in action, the cutter stands in a central position in advance of the runners, so as to cut a continuous path through the vines. The upper end of the rod or standard $w$ is connected by a chain $w^4$, passing under a guide-pulley $w^5$, to the front end of the lever P, so that when the lever is operated to lift the runners and blades out of action it also acts through the chain to tip the front cutter W upward out of action, as represented in Fig. 3, thus leaving the machine in condition to be readily transported from place to place.

The propulsion of the machine is effected by means of a doubletree or equivalent draft connection X, mounted on the rear end of the beam, it being the intention to use two horses, one on each side of the beam in rear of the main wheels.

For the purpose of preventing the blades and runners from shifting sidewise by reason of the resistance which they encounter in action we propose to provide each runner at the rear end with a downwardly-projecting blade Y of any appropriate form to enter the ground and resist side motion.

In operating the machine the parts are adjusted in the position shown in Fig. 1 and the machine carried forward between two rows of vines or hills. The cutter W, traveling in advance, severs the vines midway between the hills, while the blades L' fall, after severing the stalks or vines close to the ground, and carry them, respectively, to the right and left, thus delivering them in two parallel windrows. The runners may be controlled in descent or subjected to a greater or less downward pressure of the springs, according to the nature of the soil and other conditions under which the machine is operated. It is to be understood that the forward cutter, although recommended, is not a necessary part of the machine. It is also to be understood that the details of the devices for suspending the runners and blades and the details of the steering mechanism may be modified within the limits of mechanical skill.

Having thus described our invention, what we claim is—

1. In a bean-harvester, a wheeled propelling-frame, longitudinal vertically-movable runners connected therewith, rearwardly-diverging blades attached to the runners, and rearwardly-diverging rods or fenders above the blades, whereby the vines are delivered laterally.

2. In a bean-harvester, the longitudinal frame, a swiveling axle provided with main wheels midway of the length of the frame, a swiveling rear wheel, draft connections in rear of the main wheels, and longitudinal runners provided with rearwardly-diverging blades forward of the main wheels, whereby the vines are severed and thrust to the right and left, affording an open passage for the main wheels and the team.

3. The main frame, its supporting-wheels, and the swiveling rear wheel, in combination with the forward cutter, the runners, and the divergent obliquely-arranged blades L', connected with and carried from the forward end of the frame.

4. The wheeled main frame and the runners laterally connected thereto and provided with blades, in combination with the lever P, the rods K, adapted to lift the runners, the runner-depressing springs on said rods, and means for locking the lever in position.

5. In a bean-harvester and in combination with the wheeled frame, the runners, their rearwardly-diverging blades, and a forward cutter W, in combination with means, substantially as described, for lifting said runners and blades out of action at will.

6. In a bean-harvester and in combination with the main frame and the adjustable runners carrying rearwardly-diverging blades, the forward cutter W and its standard and pivoted carrying-block, in combination with a hand-lever P and connections from said lever to the runners and to the standard of the forward cutter, respectively, whereby the lever is adapted to lift both the runners and the forward cutter out of action.

In testimony whereof we have hereunto set our hands each in the presence of two attesting witnesses.

JOSEPH F. KING.
SAMUEL B. STOKELY.

Witnesses as to signature of Joseph F. King:
G. R. BELLAH,
S. B. ROSE,

Witnesses as to signature of Samuel B. Stokely:
H. P. WRIGHT,
BEN. E. BLACK.